US009648592B2

(12) United States Patent
Forster et al.

(10) Patent No.: US 9,648,592 B2
(45) Date of Patent: May 9, 2017

(54) FINE-GRAIN AND BACKWARD-COMPLIANT RESOURCE ALLOCATION

(71) Applicant: Nokia Solutions and Networks Oy, Espoo (FI)

(72) Inventors: Josef Forster, Kipfenberg (DE); Martin Goldberg, Tokyo (JP); Ulrich Rehfuess, Munich (DE); Sabine Roessel, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 183 days.

(21) Appl. No.: 14/591,086

(22) Filed: Jan. 7, 2015

(65) Prior Publication Data
US 2015/0124754 A1 May 7, 2015

Related U.S. Application Data

(63) Continuation of application No. 13/058,034, filed as application No. PCT/EP2008/060476 on Aug. 8, 2008, now Pat. No. 8,965,429.

(51) Int. Cl.
*H04B 7/00* (2006.01)
*H04B 15/00* (2006.01)
*H04W 72/00* (2009.01)
*H04W 72/04* (2009.01)
*H04W 4/20* (2009.01)

(52) U.S. Cl.
CPC ......... *H04W 72/0406* (2013.01); *H04W 4/20* (2013.01); *H04W 72/0453* (2013.01)

(58) Field of Classification Search
CPC .................................. H04W 72/0406
USPC ......................................................... 455/509
See application file for complete search history.

(56) References Cited

U.S. PATENT DOCUMENTS

| 5,754,961 A * | 5/1998 | Serizawa ................. H04B 7/26 370/343 |
| 7,843,873 B2 * | 11/2010 | Tzavidas ............... H04W 72/10 370/329 |
| 8,340,676 B2 | 12/2012 | Nory et al. .................... 455/450 |
| 8,437,705 B2 | 5/2013 | Khoshnevis et al. ........... 455/69 |

(Continued)

FOREIGN PATENT DOCUMENTS

| CN | 101120532 A | 2/2008 |
| WO | WO 2008042513 A2 | 4/2008 |
| WO | WO 2008057388 A1 | 5/2008 |

OTHER PUBLICATIONS

Seidel, E., "Progress on "LTE Advanced"—the new 4G standard", Nomor Research, Munich, Germany, Jul. 24, 2008, 3 pgs.

(Continued)

*Primary Examiner* — Tilahun B Gesesse
(74) *Attorney, Agent, or Firm* — Harrington & Smith

(57) ABSTRACT

There is provided fine-grain and backward-compliant resource allocation, comprising allocating, to a control channel, one of a first plurality of bandwidths being standardized for a first radio access standard, and allocating, to a data channel, one of a second plurality of bandwidths being standardized for a second radio access standard, the second bandwidths plurality exceeding the first bandwidths plurality in terms of at least one of granularity and range. The thus disclosed resource allocation may exemplarily be applied on a downlink.

23 Claims, 10 Drawing Sheets

(56) References Cited

U.S. PATENT DOCUMENTS

| | | | |
|---|---|---|---|
| 2006/0183429 A1 | 8/2006 | Anderson | 455/67.13 |
| 2009/0290597 A1* | 11/2009 | Baumgartner | H04J 11/0069 370/468 |
| 2010/0118773 A1 | 5/2010 | Kawamura et al. | 370/328 |
| 2010/0331030 A1 | 12/2010 | Nory et al. | 455/509 |

OTHER PUBLICATIONS

Kyasanur, P., et al., "On the efficacy of separating control and data into different frequency bands", Broadband Networks, 2005, $2^{nd}$ International Conference on in Broadband Networks, Abstract only, 1 page.

3GPP TS 36.211 V8.3.0 (May 2008); $3^{rd}$ Generation Partnership Project, Technical Specification Group Radio Access Network, Evolved Universal Terrestrial Radio-Access (E-UTRA); Physical Channels and Modulation (release 8):, $3^{rd}$ Generation Partnership Project (3GPP), Mobile Competence Centre; 650 Route des Lucioles F-06921 Sophia-Antpolis, Cedex, France, pp. 1-77.

3GPP TSG RAN WG1 Meeting #53bis, R1-082468, Carrier aggregation in LTE-Advanced, XP050110739; Jun. 30-Jul. 4, 2008, Warsaw, Poland.

* cited by examiner

Fig. 5

FINE-GRAIN AND BACKWARD-COMPLIANT RESOURCE ALLOCATION

CROSS-REFERENCE TO A RELATED PATENT APPLICATIONS

This patent application is a continuation of U.S. patent application Ser. No. 13/058,034, filed Mar. 1, 2011, which claims priority to International Application No. PCT/EP2008/060476 filed Aug. 8, 2008, which are hereby incorporated by reference in their entireties.

FIELD OF THE INVENTION

The present invention generally relates to fine-grain and backward-compliant resource allocation. In particular, the present invention relates to fine-grain and backward-compliant resource allocation in a radio access network environment.

BACKGROUND OF THE INVENTION

In the development of radio communication systems, such as mobile communication systems (like for example GSM (Global System for Mobile Communication), GPRS (General Packet Radio Service), UMTS (Universal Mobile Telecommunication System) or the like), efforts are made for an evolution of the radio access part thereof. In this regard, the evolution of radio access networks (like for example the GSM EDGE radio access network (GERAN) and the Universal Terrestrial Radio Access Network (UTRAN) or the like) is currently addressed in research and development as well as in standardization. Accordingly, such improved radio access networks are sometimes denoted as evolved radio access networks (like for example the Evolved Universal Terrestrial Radio Access Network (E-UTRAN)) or as being part of a long-term evolution (LTE). Although such denominations primarily stem from 3GPP (Third Generation Partnership Project) terminology, the usage thereof hereinafter is not intended to limit the respective description to 3GPP technology, but is rather intended to generally refer to any kind of radio access evolution irrespective of the specific underlying system architecture.

In the following, for the sake of intelligibility, LTE (Long-Term Evolution according to 3GPP terminology) is taken as a non-limiting example for a radio access network being applicable in the context of the present invention and its embodiments. However, it is to be noted that any kind of radio access network may likewise be applicable, as long as it exhibits comparable features and characteristics as described hereinafter.

The radio interface in LTE (or E-UTRAN) is based on Orthogonal Frequency Division Multiple Access (OFDMA), which is one exemplary modulation scheme applicable for broadband radio access (or other radio access technologies). In the downlink direction of the LTE (or E-UTRAN) radio interface, there are defined a Physical Downlink Shared Channel (PDSCH) and a Physical Multicast Channel (PMCH) as downlink data channels, as well as a Physical Downlink Control Channel (PDCCH), a Physical Control Format Indicator Channel (PCFICH), a Physical Hybrid Indicator Channel (PHICH), a Physical Broadcast Channel (PBCH) and Primary and Secondary synchronization channels (SCHs) as downlink control channels. In the uplink direction of the LTE (or E-UTRAN) radio interface, there are—among others—defined a Physical Uplink Shared Channel (PUSCH) and a Physical Uplink Control Channel (PUCCH).

In the following, mainly the downlink case is described in detail, while the principles set out in this regard are analogously applicable to the corresponding uplink channels in the uplink case.

The resource mapping of the downlink channel types depends on the downlink system bandwidth (N_DL_RB), which may be used as a configuration parameter and represents the available number of downlink resource blocks (RBs) constituting a resource grid for a multiple access scheme.

According to the present LTE example, the Physical Control Format Indicator Channel (PCFICH) is used to broadcast the number of OFDM symbols used for control signalling purposes by the PDCCH control channel (i.e. 1, 2, or 3). The PCFICH information consists of 32 bits coded into 16 QPSK modulation symbols (QPSK: Quadrature Phase Shift Keying) which are mapped in the first OFDM symbol of a subframe as four symbol quadruplets to four resource element (RE) groups (of consecutive subcarriers), wherein these resource element groups are equally distant to each other in the frequency dimension. The position of the four resource element groups varies with the physical cell identifier such that basically all possible resource element group positions can be reached by the resource mapping of the PCFICH control channel. For details of the PCFICH resource mapping, reference is made to the specification document 3GPP TS 36.211 v8.3.0, Chapter 6.7.4.

As a result, the PCFICH control channel according to current specification practically extends over the complete carrier frequency spectrum.

According to the present LTE example, the Physical Hybrid Indicator Channel (PHICH) contains positive and negative acknowledgements (ACK/NAKs) corresponding to uplink transmissions, i.e. for the uplink hybrid automatic-repeat-request (HARQ). The PHICH is assigned to three resource element (RE) groups whose positions depend on the downlink system bandwidth (N_DL_RB), the resource element groups already covered by the PCFICH control channel, on the Hybrid ARQ group index, the physical cell identifier, and the frame structure. Assuming a typical allocation, the PHICH is allocated to the first OFDM symbol or in the first three OFDM symbols in each subframe and spread in three portions over the carrier bandwidth. For details of the PHICH resource mapping, reference is made to the specification document 3GPP TS 36.211 v8.3.0, Chapter 6.9.3.

As a result, the PHICH control channel according to current specification practically extends over the complete carrier frequency spectrum.

According to the present LTE example, the Physical Downlink Control Channel (PDCCH) contains uplink and downlink control information, i.e. scheduling assignments. By way of these user equipment-specific control information, the allocations on a data channel (e.g. PDSCH) are defined for the respective user equipment. The PDCCH is built from control channel elements (CCEs) and maps (except for resources used by the PCFICH and PHICH control channels) to the entire configured downlink system bandwidth (N_DL_RB) for the first up to the first three OFDM symbols of a subframe. According to current specification, there are four PDCCH format types referring to four different control channel element (CCE) aggregation levels (i.e. to four different numbers of CCEs being associated with the respective PDCCH format type, namely 1, 2, 4, or 8). For details of the PDCCH resource mapping, reference is made to the specification document 3GPP TS 36.211 v8.3.0, Chapter 6.8.5.

As a result, the PDCCH control channel according to current specification is distributed over the complete carrier frequency spectrum (depending on the user equipment identifier) in order to support blind decoding by the user equipment.

Each user equipment scheduled in a considered subframe—whether in downlink or in uplink—requires a downlink control information (DCI) element in the PDCCH control channel. The size of the DCI element depends on the DCI format, the downlink and uplink bandwidth configuration (N_DL_RB and N_UL_RB), as well as a resource size parameter P. In the following, the presently specified DCI formats and sizes are summarized.

Format 0
  Scheduling/Control Purpose: PUSCH
  Variation parameter: N_UL_RBs
Format 1, 1A, 1B, 1C
  Scheduling/Control Purpose of Format 1: PDSCH SIMO, TX diversity, Beamforming
  Scheduling/Control Purpose of Format 1A: Compact PDSCH Single Antenna, TX diversity, Beamforming
  Scheduling/Control Purpose of Format 1B: PDSCH Closed Loop TX diversity
  Scheduling/Control Purpose of Format 1C: Scheduling grants for BCCH, RACH, and Paging responses
  Variation parameter: N_DL_RBs, P
Format 2, 2A
  Scheduling/Control Purpose: PDSCH Open Loop/Closed Loop Spatial Multiplexing
  Variation parameter: N_DL_RBs, P
Format 3, 3A
  Scheduling/Control Purpose of Format 3: TPC for 2 bit Power Control on PUCCH/PUSCH
  Scheduling/Control Purpose of Format 3A: TPC for 1 bit Power Control on PUCCH/PUSCH In the above, PUSCH stands for Physical Uplink Shared Channel, PUCCH stands for Physical Uplink Control Channel, SIMO stands for single-input-multiple-output, TX stands for transmission, BCCH stands for Broadcast Control Channel, RACH stands for Random Access Channel, and TPC stands for Transmit Power Control.

In view of the above, according to the present LTE example, while the PBCH and the Primary and Secondary SCH are centered with regard to the downlink carrier using a narrow bandwidth of six resource blocks (RBs), the PDCCH, the PCFICH and the PHICH extend over the complete downlink system bandwidth, as configured by the parameter N_DL_RB. The PDSCH and the PMCH allocations, i.e. the data channel allocations, are controlled by scheduling.

Since the control channels, for example those mentioned above, conventionally have allocation positions (resource mappings) ranging over the complete available frequency spectrum, no arbitrary downlink system bandwidth scaling is feasible.

The LTE downlink system bandwidth could be configured, if all options for N_DL_RB ranging from 6 RBs up to 110 RBs are supported.

It is, however, not possible to address (in particular, in DCI Format 0, Format 1, or Format 3) another bandwidth than the one already used for the PDCCH control channel.

Furthermore, according to current specification (known as Release-8), only selected downlink (or uplink) system bandwidths are supported for being. For a frequency division duplex (FDD) scenario, these are for example 1.4 MHz, 3 MHz, 5 MHz, 10 MHz, 15 MHz, and 20 MHz. That is, only one of these six standardized bandwidths may be allocated both to any control channel and any data channel (in uplink or in downlink).

Therefore, standardized downlink (or uplink) system bandwidths may lead e.g. to violations of emission limits (if selected too wide) or do not fully exploit the available spectrum (if selected too narrow), which applies for example in typical coexistence situations. Consequently, deployment situations may arise, where at least the downlink (or uplink) system bandwidth cannot be matched efficiently by one of the standardized system bandwidths, e.g. by one of the six LTE Release-8 system bandwidths. Thus, arbitrary downlink (or uplink) system bandwidth scaling is not feasible according to current specification (e.g. LTE Release-8).

Namely, using a smaller (undersized) standardized downlink (or uplink) system bandwidth drastically reduces spectral efficiency, while using a larger (oversized) standardized bandwidth is simply not possible due to regulator's requirements and emission limits.

For example, if an LTE Release-8 radio access network is rolled out with 3 MHz downlink bandwidth in a spectrum block of 4.2 MHz, the downlink bandwidth to be allocated to control and data channels is at most 3 MHz (since the next higher standardized bandwidth of 5 MHz is already too large). Thus, as is evident from the above, the usage of a bandwidth (or a combination of bandwidths) being smaller than the available bandwidth reduces spectral efficiency both in uplink and in downlink.

Accordingly, there does not exist any feasible solution to the above drawbacks and requirements, which is mainly due to the (widespread) allocation positions of control channels and the binding to a limited set of standardized bandwidths.

SUMMARY OF EMBODIMENTS OF THE INVENTION

The present invention and its embodiments are made to address one or more of the abOve-described drawbacks and requirements. Thus, the present invention and its embodiments are intended to mitigate drawbacks and to fulfill requirements in resource allocation in a radio access environment.

According to exemplary aspects of the present invention, there are disclosed:
  a method as set out in any one of claims 1 to 14,
  an apparatus as set out in any one of claims 15 to 28,
  a computer program product as set out in claim 29,
  a method as set out in any one of claims 30 to 38,
  an apparatus as set out in any one of claims 39 to 46,
  a computer program product as set out in claim 47.

According to an exemplary first aspect of the present invention, there is provided a method comprising allocating, to a control channel, one of a first plurality of bandwidths being standardized for a first radio access standard, and allocating, to a data channel, one of a second plurality of bandwidths being standardized for a second radio access standard, the second bandwidths plurality exceeding the first bandwidths plurality in terms of at least one of granularity and range.

According to further developments or modifications thereof, one or more of the following applies:
  the method further comprises scheduling a terminal to a bandwidth area of the allocated data channel, wherein a terminal complying with the first radio access standard is scheduled to a bandwidth area of the first bandwidths plurality being supported by the first radio access standard, and a terminal complying with the second radio access standard is scheduled to a bandwidth area of the second bandwidths plurality being supported by the second radio access standard, the data channel allocation comprises adjusting said one allocated bandwidth of the second plurality of bandwidths to an available bandwidth spectrum, the data channel allocation comprises including control information being specific for a terminal to be scheduled at least into the allocated control channel within a bandwidth area of the first bandwidths plurality being supported by the first radio access standard, the control information inclusion for a terminal complying with the first radio access standard or a terminal complying with the second radio access standard and fitting into a resource allocation control scheme according to the first radio access standard comprises inserting, into the allocated control channel, the control information for resource allocation in the allocated data channel within a bandwidth area of the first bandwidths plurality being supported by the first radio access standard, the control information inclusion for a terminal complying with the second radio access standard and not fitting into a resource allocation control scheme according to the first radio access standard comprises inserting, into the allocated control channel, the control information for resource allocation in the allocated data channel within a bandwidth area of the second bandwidths plurality being supported by the second radio access standard, the control information inclusion for a terminal complying with the second radio access standard and not fitting into a resource allocation control scheme according to the first radio access standard comprises inserting, at least into the allocated control channel and the allocated data channel, the control information for resource allocation in the allocated data channel within a bandwidth area of the second bandwidths plurality being supported by the second radio access standard, if the control information requires more resources than are available in the allocated control channel, a first part of the control information serving as an anchor is inserted into the control channel, and a second part of the control information serving as a supplement, to which the anchor refers, is inserted into the data channel, the second part of the control information is inserted in a first modulation symbol of the data channel, which directly follows the control channel, the scheduling is based on the included control information, the method is operable in an evolved radio access network, and/or the first radio access standard is in accordance with release 8 of a long-term evolution specification, and/or the second radio access standard is in accordance with release 9 or advanced of a long-term evolution specification According to an exemplary second aspect of the present invention, there is provided an apparatus comprising a control channel resource allocator configured to allocate, to a control channel, one of a first plurality of bandwidths being standardized for a first radio access standard, and a data channel resource allocator configured to allocate, to a data channel, one of a second plurality of bandwidths being standardized for a second radio access standard, the second bandwidths plurality exceeding the first bandwidths plurality in terms of at least one of granularity and range.

According to further developments or modifications thereof, one or more of the following applies:

the apparatus further comprises a scheduler configured to schedule a terminal to a bandwidth area of the allocated data channel, wherein the scheduler is configured such that a terminal complying with the first radio access standard is scheduled to a bandwidth area of the first bandwidths plurality being supported by the first radio access standard, and a terminal complying with the second radio access standard is scheduled to a bandwidth area of the second bandwidths plurality being supported by the second radio access standard, the data channel allocator comprises an adjuster configured to adjust said one allocated bandwidth of the second plurality of bandwidths to an available bandwidth spectrum, the data channel allocator comprises an includer configured to include control information being specific for a terminal to be scheduled at least into the allocated control channel within a bandwidth area of the first bandwidths plurality being supported by the first radio access standard, the includer comprises a first inserter configured to insert, for a terminal complying with the first radio access standard or a terminal complying with the second radio access standard and fitting into a resource allocation control scheme according to the first radio access standard, into the allocated control channel, the control information for resource allocation in the allocated data channel within a bandwidth area of the first bandwidths plurality being supported by the first radio access standard, the includer comprises a second inserter configured to insert, for a terminal complying with the second radio access standard and not fitting into a resource allocation control scheme according to the first radio access standard, into the allocated control channel, the control information for resource allocation in the allocated data channel within a bandwidth area of the second bandwidths plurality being supported by the second radio access standard, the includer comprises a third inserter configured to insert, for a terminal complying with the second radio access standard and not fitting into a resource allocation control scheme according to the first radio access standard, into the allocated control channel and the allocated data channel, the control information for resource allocation in the allocated data channel within a bandwidth area of the second bandwidths plurality being supported by the second radio access standard, if the control information requires more resources than are available in the allocated control channel, the third inserter is configured to insert a first part of the control information serving as an anchor into the control channel, and insert a second part of the control information serving as a supplement, to which the anchor refers, into the data channel, the third inserter is configured to insert the second part of the control information in a first modulation symbol of the data channel, which directly follows the control channel, the scheduler is configured to perform the scheduling on the basis of the included control information, the apparatus comprises at least one of a base station and an evolved radio access node in an evolved radio access network, and/or the first radio access standard is in accordance with release 8 of a long-term evolution specification, and/or the second radio access standard is in accordance with release 9 or advanced of a long-term evolution specification.

According to an exemplary third aspect of the present invention, there is provided a computer program product comprising program code means being arranged, when run on a processor of an apparatus (according to the above-described second aspect and/or any one of its developments and modifications), to perform the method according to the above-described first aspect and/or any one of its developments and modifications.

According to an exemplary fourth aspect of the present invention, there is provided a method comprising receiving a control channel having allocated one of a first plurality of bandwidths being standardized for a first radio access standard, identifying, in the received control channel, a data channel allocation on a data channel, the data channel having allocated one of a second plurality of bandwidths being standardized for a second radio access standard, the second bandwidths plurality exceeding the first bandwidths plurality in terms of at least one of granularity and range, and controlling a data transmission operation on the data channel in accordance with the identified data channel allocation.

According to further developments or modifications thereof, one or more of the following applies:

the data channel allocation identification comprises acquiring control information at least in the received control channel within a bandwidth area of the first bandwidths plurality being supported by the first radio access standard, if the acquired control information is located in the control channel, the method comprises determining the data channel allocation on the basis of the acquired control information in the control channel, if a first part of the acquired control information serving as an anchor is located in the control channel and a second part of the control information serving as a supplement, to which the anchor refers, is located in the data channel, the method comprises determining a partial data channel allocation in a bandwidth area of the first bandwidths plurality being supported by the first radio access standard on the basis of the acquired first part of the control information in the control channel, and determining a complete data channel allocation in a bandwidth area of the second bandwidths plurality being supported by the second radio access standard on the basis of the acquired second part of the control information in the data channel, the second part of the control information is inserted in a first modulation symbol of the data channel, which directly follows the control channel, the method is operable in an evolved radio access network, and/or the first radio access standard is in accordance with release 8 of a long-term evolution specification, and/or the second radio access standard is in accordance with release 9 or advanced of a long-term evolution specification.

According to an exemplary fifth aspect of the present invention, there is provided an apparatus comprising a receiver configured to receive a control channel having allocated one of a first plurality of bandwidths being standardized for a first radio access standard, an identifier configured to identify, in the received control channel, a data channel allocation on a data channel, the data channel having allocated one of a second plurality of bandwidths being standardized for a second radio access standard, the second bandwidths plurality exceeding the first bandwidths plurality in terms of at least one of granularity and range, and a controller configured to control a data transmission operation of the apparatus on the data channel in accordance with the identified data channel allocation.

According to further developments or modifications thereof, one or more of the following applies:

the identifier comprises an acquirer configured to acquire control information at least in the received control channel within a bandwidth area of the first bandwidths plurality being supported by the first radio access standard, the apparatus further comprises a first determiner configured to determine the data channel allocation on the basis of the acquired control information, the first determiner being configured, if the acquired control information is located in the control channel, to determine the data channel allocation on the basis of the acquired control information in the control channel, the apparatus further comprises a second determiner configured to determine the data channel allocation on the basis of the acquired control information, the second determiner being configured, if a first part of the acquired control information serving as an anchor is located in the control channel and a second part of the control information serving as a supplement, to which the anchor refers, is located in the data channel, to determine a partial data channel allocation in a bandwidth area of the first bandwidths plurality being supported by the first radio access standard on the basis of the acquired first part of the control information in the control channel, and to determine a complete data channel allocation in a bandwidth area of the second bandwidths plurality being supported by the second radio access standard on the basis of the acquired second part of the control information in the data channel, the apparatus comprises at least one of a mobile station and an evolved user equipment in an evolved radio access network, and/or the first radio access standard is in accordance with release 8 of a long-term evolution specification, and/or the second radio access standard is in accordance with release 9 or advanced of a long-term evolution specification.

According to an exemplary sixth aspect of the present invention, there is provided a computer program product comprising program code means being arranged, when run on a processor of an apparatus (according to the above-described fifth aspect and/or any one of its developments and modifications), to perform the method according to the above-described fourth aspect and/or any one of its developments and modifications.

According to any one of the above-described aspects, developments and modifications, one or more of the following may apply:

the control channel is a downlink control channel, and the data channel is a downlink data channel, the control channel is at least one of a physical downlink control channel PDCCH, a physical hybrid indicator channel PHICH, and a physical control format indicator channel PCFICH, and/or the data channel is at least one of a physical downlink shared channel PDCCH and a physical multicast channel PMCH.

By way of exemplary embodiments of the present invention, there is provided a fine-grain and flexible bandwidth adjustment for an advanced radio access standard, which is backward-compliant with a previous radio access standard (of restricted capability). That is, although a first standard (such as e.g. LTE Release-8) suffers from widespread control channel allocation positions and a binding to a limited number of standardized bandwidths, a second (evolved) standard (such as e.g. LTE Release-9 or advanced) may be applied to provide for an extended and more flexible data channel bandwidth allocation.

By virtue of exemplary embodiments of the present invention, there is provided an extended data channel in terms of at least one of bandwidth granularity and range, while backward-compliance is achieved by way of using a non-extended control channel allocation. As an example, a fine-grain bandwidth adjustment to flexible system bandwidths (e.g. to the available operator bandwidth) may be implemented within an LTE Release-8 framework, i.e. while an LTE Release-8 user equipment may still be operated in the same radio access network. The thus disclosed resource allocation may exemplarily be applied on a downlink.

BRIEF DESCRIPTION OF THE DRAWINGS

In the following, the present invention will be described in greater detail by way of non-limiting examples with reference to the accompanying drawings, in which FIG. 5 shows a schematic representation of a resource grid of a downlink channel structure corresponding to a second exemplary use case, when an embodiment of the present invention is applied.

DETAILED DESCRIPTION OF EMBODIMENTS OF THE PRESENT INVENTION

The present invention is described herein with reference to particular non-limiting examples. A person skilled in the art will appreciate that the invention is not limited to these examples, and may be more broadly applied.

In particular, the present invention and its embodiments are mainly described in relation to 3GPP specifications being used as non-limiting examples for certain exemplary network configurations. In particular, an LTE (E-UTRAN) radio access network and corresponding standards (Release-8, Release-9, and LTE-Advanced) are used as a non-limiting example in this regard. As such, the description of the embodiments given herein specifically refers to terminology which is directly related thereto. Such terminology is only used in the context of the presented non-limiting examples, and does naturally not limit the invention in any way. Rather, any other network configuration or implementation may also be utilized as long as compliant with the features described herein.

In the following, various embodiments and implementations of the present invention and its aspects are described using several alternatives. It is generally to be noted that, according to certain needs and constraints, all of the described alternatives may be provided alone or in any conceivable combination (also including combinations of individual features of the various alternatives).

Figure 1:
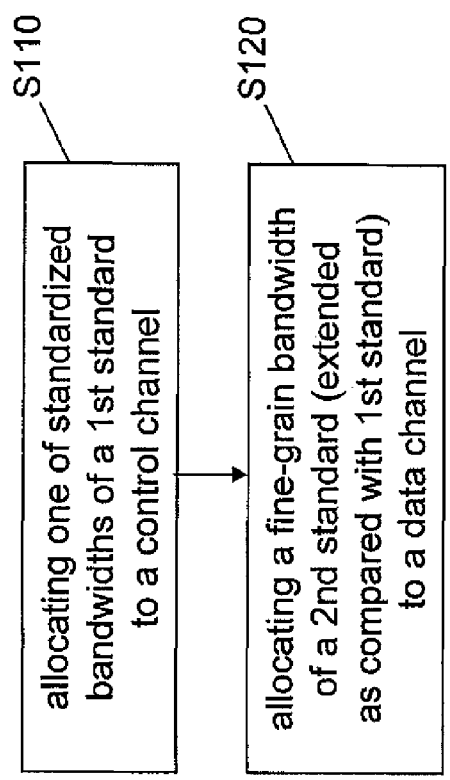
FIG. 1 shows a flow diagram of a generic method according to an embodiment of the present invention.

FIG. 1 shows a flow diagram of a generic method according to an embodiment of the present invention.

In most generic terms, a method according to an embodiment of the present invention as depicted in FIG. 1 comprises a control channel allocation operation (S110) and a data channel allocation operation (S120). In the control channel allocation of operation S110, one of a first plurality of bandwidths being standardized for a first radio access standard is allocated to a control channel (e.g. a downlink control channel such as the PDCCH). In the data channel allocation of operation S120, one of a second plurality of bandwidths being standardized for a second radio access standard is allocated to a data channel (e.g. a downlink data channel such as the PDSCH), wherein the second bandwidths plurality exceeds the first bandwidths plurality in terms of at least one of granularity and range. For example, the first radio access standard may be in accordance with LTE Release-8, wherein the standardized plurality of bandwidths e.g. includes 1.4 MHz, 3 MHz, 5 MHz, 10 MHz, 15 MHz, or 20 MHz. For example, the second radio access standard may be in accordance with LTE Release-9 or advanced, wherein the standardized plurality of bandwidths includes any implementable available (operator or system) bandwidth.

According to the present embodiment, this method is performed at a base station or an evolved radio access node (e.g. eNodeB) in an evolved radio access network (e.g. E-UTRAN, LTE). It may be analogously applied for downlink and uplink cases.

As an example for the downlink case, the thus allocated LTE downlink system bandwidth can be as fine-grain as in multiples of physical resource blocks (PRBs) in the resource grid for the Physical Downlink Shared Channel (PDSCH). Notwithstanding the thus extendedly allocated data channel, the control channels such as e.g. PCFICH and PHICH still extend over the full bandwidth and adhere to one of the six standardized bandwidths, e.g. 1.4 MHz, 3 MHz, 5 MHz, 10 MHz, 15 MHz, or 20 MHz.

By way of the present embodiment (and all other embodiments described hereinafter), the two following use cases may be advantageously realized.

As a first use case (i.e. exemplary application), a later migration of a radio access network according to a first standard (e.g. an LTE Release-8 network) for full exploitation of the available frequency spectrum may be accomplished. Namely, an LTE Release-8 network is rolled-out with 3 MHz downlink bandwidth in a 4.2 MHz (former GSM) spectrum block. The network is later migrated to an LTE Release-9 or LTE-Advanced network providing 4.2 MHz downlink bandwidth on the data channel (not existing in LTE Release-8), but at the same time still supporting existing LTE Release-8 terminals with 3 MHz bandwidth, since the control channel bandwidth is still 3 MHz.

As a second use case (i.e. exemplary application), a support of LTE Release-8 roaming terminals in an LTE Release-9 or LTE-Advanced network providing e.g. 9 MHz downlink system bandwidth rather than 5 MHz or 5 MHz+3 MHz (or other less efficient downlink system bandwidth combinations) may be accomplished.

Figure 2:
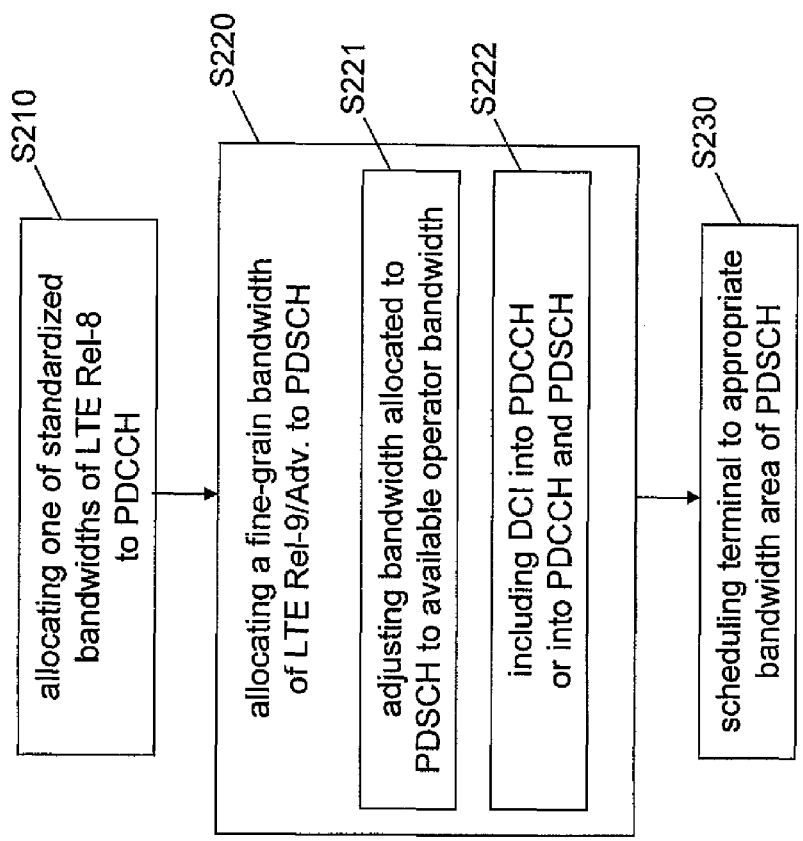
FIG. 2 shows a flow diagram of an exemplary method of resource allocation according to an embodiment of the present invention.

FIG. 2 shows a flow diagram of an exemplary method of resource allocation according to an embodiment of the present invention, which is exemplarily set out for a downlink case.

The method according to the thus depicted embodiment comprises a control channel allocation operation (S210) and a data channel allocation operation (S220), which corresponds to the respective operations according to the embodiment of FIG. 1, as well as a scheduling operation (S230). In the scheduling of operation S230, a terminal is scheduled to a bandwidth area of the allocated downlink data channel such that a terminal complying with the above-mentioned first radio access standard (e.g. LTE Release-8) is scheduled to a bandwidth area of the first bandwidths plurality being supported by the first radio access standard (e.g. 3 MHz), and a terminal complying with the above-mentioned second radio access standard (e.g. LTE Release-9 or advanced) is scheduled to a bandwidth area of the second bandwidths plurality being supported by the second radio access standard (e.g. 4.2 MHz).

According to FIG. 2, there are also depicted two sub-operations within the data channel allocation of operation S220. These two sub-operations are independent of each other and of the above-mentioned scheduling operation. Accordingly, these three features according to the embodiment of FIG. 2 may be implemented independent of each other, i.e. in any conceivable combination.

According to an operation S221, the data channel allocation operation includes an adjustment of said one allocated bandwidth of the second plurality of bandwidths, i.e. the bandwidth allocated to the control channel, to an available bandwidth spectrum. According to an operation S222, the data channel allocation operation includes an inclusion of downlink control information (DCI) being specific for a terminal (or user equipment UE) to be scheduled at least into the allocated downlink control channel (namely, either in the allocated downlink control channel alone or both in the allocated downlink control and data channels) within a bandwidth area of the first bandwidths plurality being supported by the first radio access standard (e.g. 3 MHz). That is, although the allocated data channel may have a bandwidth e.g. of 4.2 MHz, the control channel has only a bandwidth of 3 MHz. Details of a possible implementation of operation S222 are described in connection, with FIG. 3 below.

Figure 3:
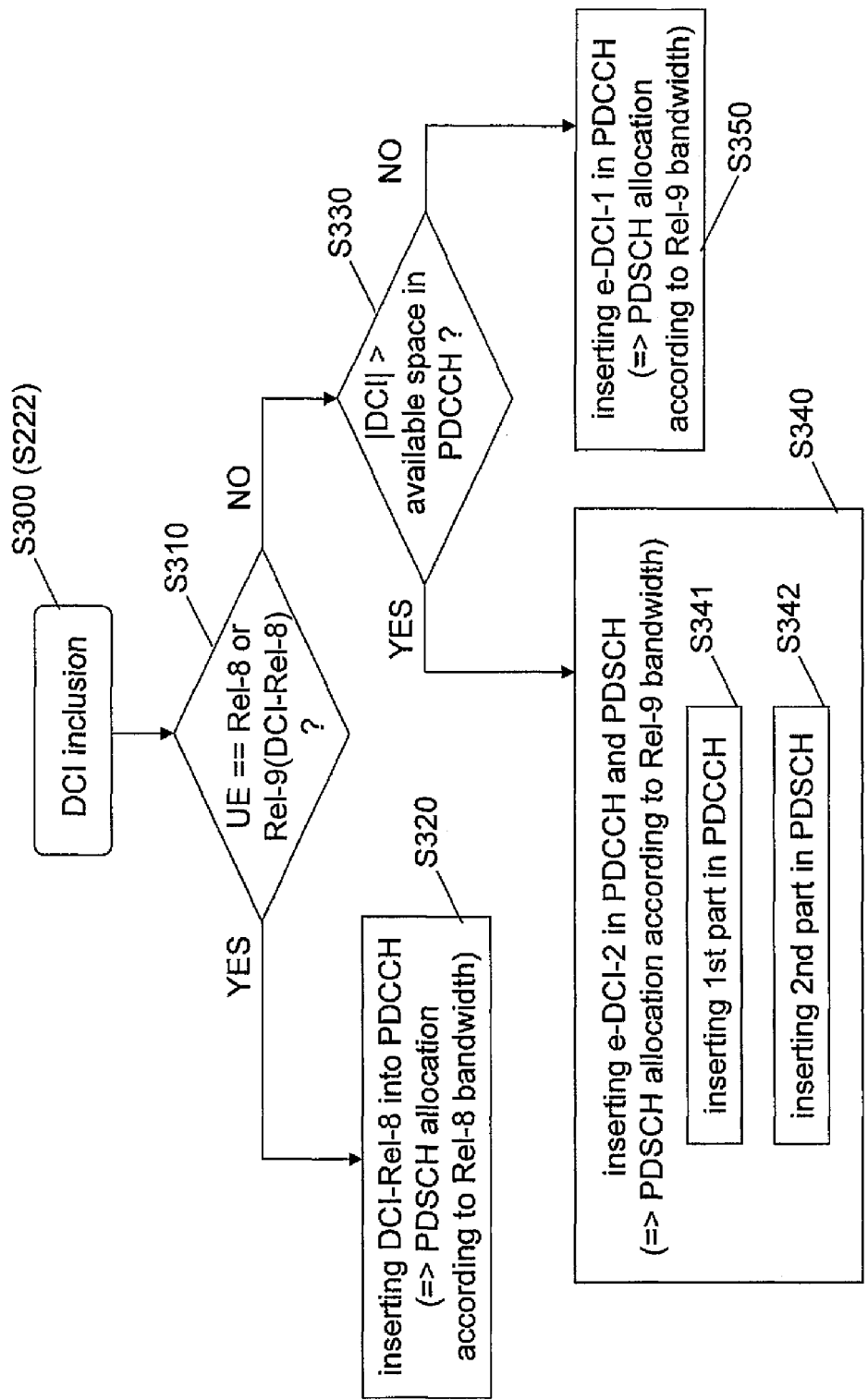
FIG. 3 shows a flow diagram of an exemplary method of downlink control information inclusion according to an embodiment of the present invention.

FIG. 3 shows a flow diagram of an exemplary method of downlink control information inclusion according to an embodiment of the present invention. Hence, the method S300 according to FIG. 3 may be implemented as operation S222 in the method according to FIG. 2 above.

The method according to the thus depicted embodiment realizes an inclusion of user equipment-specific downlink control information into downlink channels, thus representing scheduling assignments in the sense of an addressing scheme. That is, the procedure of DCI inclusion depends, on the one hand, on the type of terminal concerned and, on the other hand, on channel structure and capabilities.

According to FIG. 3, it is first distinguished in operation S310 whether the terminal concerned (i.e. the terminal for which downlink channel allocation is to be accomplished) is a terminal which complies with the first radio access standard (e.g. LTE Release-8 terminal) or a terminal which complies with the second radio access standard (e.g. LTE Release-9 or advanced terminal), but which nevertheless fits into a resource allocation control scheme according to the first radio access standard. The latter may be when an LTE Release-9 terminal is operated in a frequency spectrum of e.g. 3 MHz, which is why the standardized 3 MHz bandwidth according to LTE Release-8 is sufficient for bandwidth allocation. If the terminal concerned is such a terminal for which the resource allocation control scheme according to the first radio access standard is sufficient (YES in S310), then downlink control information (DCI) in accordance with the first standard (e.g. LTE Release-8) is inserted into the allocated downlink control channel (e.g. PDCCH) in operation S320. The thus specified terminal may thus use a bandwidth area according to e.g. LTE Release-8 (e.g. 3 MHz) in the downlink data channel. Otherwise, if the terminal concerned is a terminal which complies with the second radio access standard and which does not fit into a resource allocation control scheme according to the first radio access standard (NO in S310), then downlink control information (DCI) in accordance with the second standard (e.g. LTE Release-9 or advanced) is inserted either into the allocated downlink control channel (e.g. PDCCH) alone or in both the allocated downlink control channel (e.g. PDCCH) and the allocated downlink data channel (e.g. PDSCH). This depends basically on whether or not the downlink control information to be inserted fit into the available space (resources) of the downlink control channel. Therefore, in operation S330, it is distinguished whether the downlink control information to be inserted requires more resources than are available in the allocated downlink control channel (e.g. PDCCH). If so (YES in S330), then the downlink control information (DCI) is inserted partly into the allocated downlink control channel (e.g. PDCCH) and partly into the allocated downlink data channel (e.g. PDSCH) in operation S340. In detail, a first part of the downlink control information serving as an anchor is inserted into the downlink control channel (S341), and a second part of the downlink control information serving as a supplement, to which the anchor refers, is inserted into the downlink data channel (S342) (thus leading to a kind of two-step-approach described below in connection with a terminal operation). The thus specified terminal may thus use a bandwidth area according to e.g. LTE Release-9 (e.g. 4.2 MHz) in the downlink data channel. Otherwise, if the required DCI is small enough to fit into the available space in the downlink control channel (NO in S330), then the downlink control information (DCI) is inserted completely into the allocated downlink control channel (e.g. PDCCH) in operation S350. The thus specified terminal may also use a bandwidth area according to e.g. LTE Release-9 (e.g. 4.2 MHz) in the downlink data channel.

It is to be noted that the above-described methods according to FIGS. 2 and 3 are analogously applicable for an uplink case, in which e.g. the PUCCH serves as the uplink control channel and the PUSCH serves as the uplink data channel.

Figure 4:
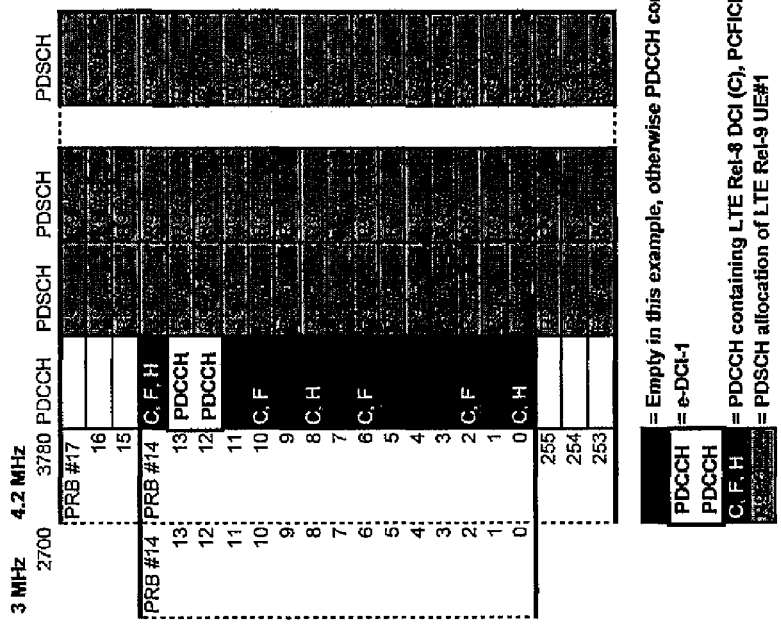
FIG. 4 shows a schematic representation of a resource grid of a downlink channel structure corresponding to a first exemplary use case, when an embodiment of the present invention is applied.
Figure 5:
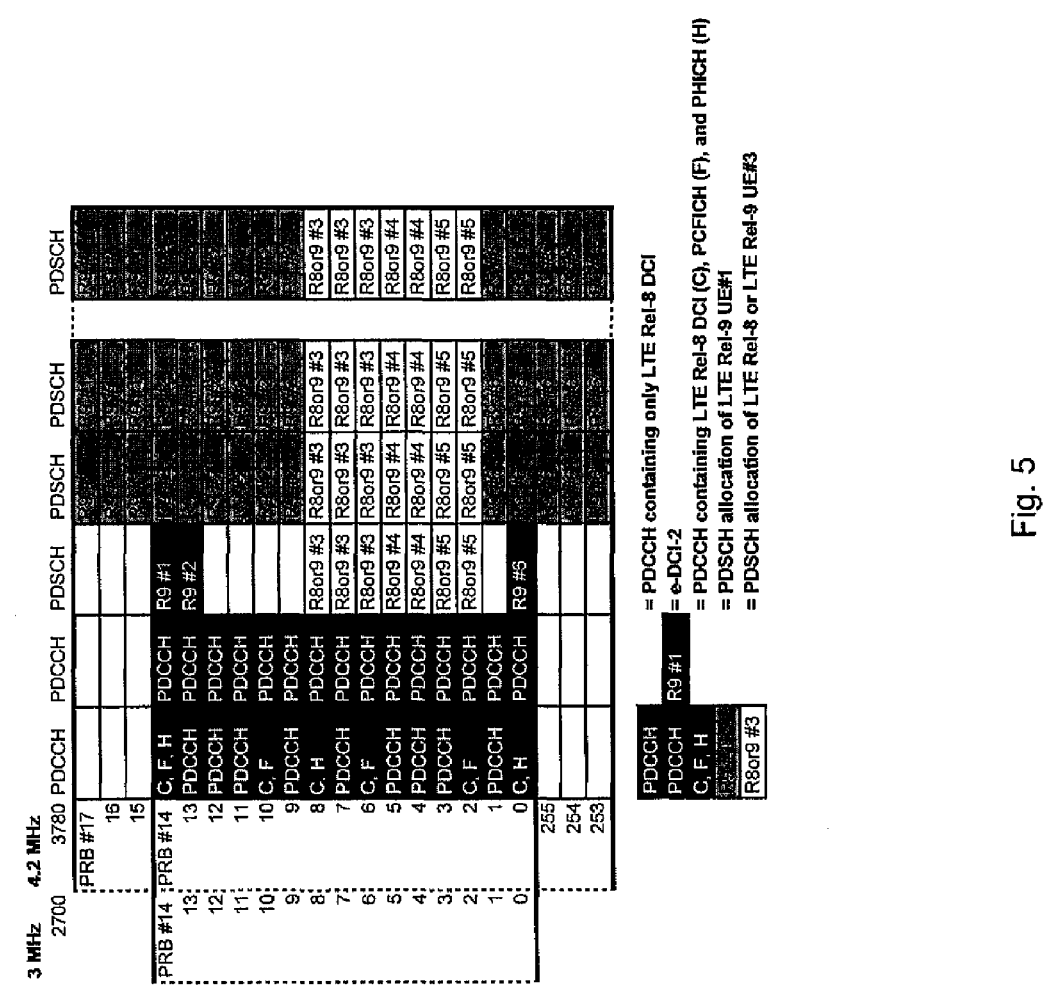
Figure 6:
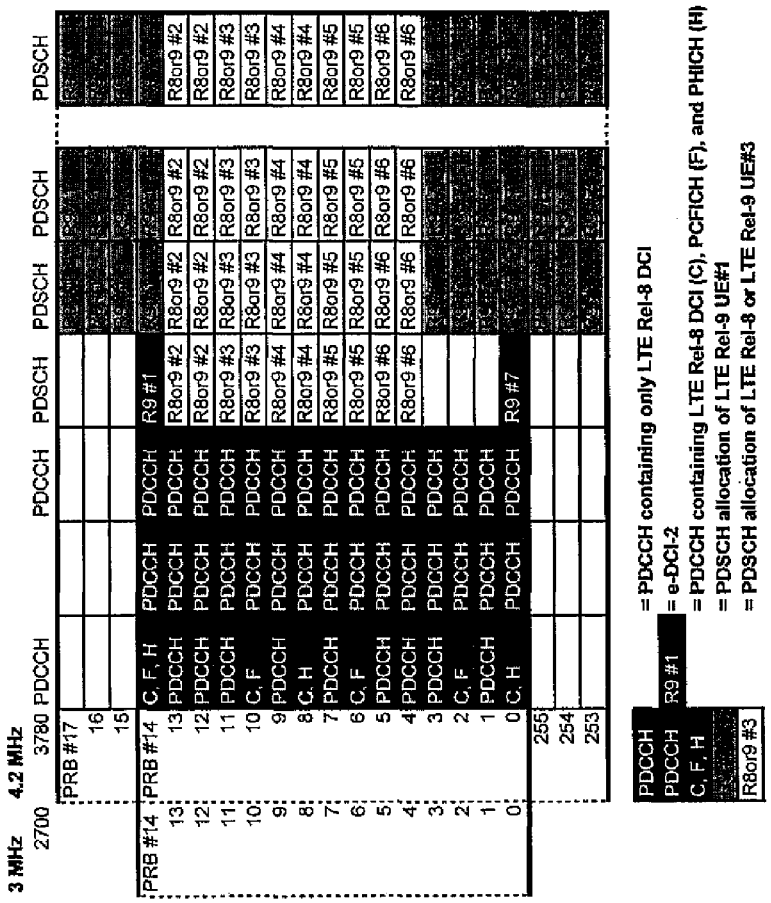
FIG. 6 shows a schematic representation of a resource grid of a downlink channel structure corresponding to a third exemplary use case, when an embodiment of the present invention is applied.

In the following, some examples of downlink channel structures resulting from embodiments of the present invention according to any one of FIGS. 1 to 3 are described in connection with FIGS. 4 to 6. In FIGS. 4 to 6, resource grids are schematically depicted, wherein a column represents one OFDM symbol in the channel denoted in the respective column, and wherein the exemplary first standard bandwidth is 3 MHz and the exemplary second standard bandwidth is 4.2 MHz. For the sake of simplicity, it is exemplarily assumed that all rate matching is done to one control channel element (CCE).

FIG. 4 shows a schematic representation of a resource grid of a downlink channel structure corresponding to a first exemplary use case, which basically corresponds to a DCI insertion according to operation S350 of FIG. 3. Namely, an extended DCI (e-DCI-1) format is realized, which may be regarded to chain (i.e. combine) two DCI elements according to the first standard (e.g. LTE Release-8) to capture a DCI element according to the second standard (e.g. LTE Release-9). In the thus depicted example, a channel structure with one control channel PDCCH (i.e. one PDDCH OFDM Symbol) and only a single terminal/user equipment UE#1 is considered, which is an LTE Release-9 or LTE-Advanced terminal.

FIG. 5 shows a schematic representation of a resource grid of a downlink channel structure corresponding to a second exemplary use case, which basically corresponds to a DCI insertion according to operation S340 of FIG. 3. Namely, an extended DCI (e-DCI-2) format is realized, which is defined to consist of one DCI element according to the first standard (e.g. LTE Release-8), which serves as an anchor in the allocated downlink control channel, plus an additional dedicated DCI element according to the second standard (e.g. LTE Release-9 or advanced), which serves as a supplement in data channel resources of the allocated downlink data channel. In the thus depicted example, a channel structure with two control channel OFDM symbols PDCCH and six terminals/user equipments UE#1-6 is considered, wherein UE#1,2,6 are LTE Release-9 or LTE-Advanced terminals and UE#3-5 are LTE Release-8 terminals.

FIG. 6 shows a schematic representation of a resource grid of a downlink channel structure corresponding to a third exemplary use case, which basically corresponds to a DCI insertion according to operation S340 of FIG. 3. Namely, an extended DCI (e-DCI-2) format is realized, which is defined as described above in connection with FIG. 5. In the thus depicted example, a channel structure with three control channels PDCCH (i.e. three PDCCH OFDM symbols) and seven terminals/user equipments UE#1-6 is considered, wherein UE#1 and UE#7 are LTE Release-9 or LTE-Advanced terminals and UE#2-6 are LTE Release-8 terminals.

As is evident from FIGS. 5 and 6, as one example, the second part of the extended DCI format may be located in the first control channel modulation symbol (e.g. PDSCH OFDM symbol) following the control channel PDCCH.

In FIGS. 5 and 6, it is shown that that at the edges of the LTE carrier bandwidth still within the smaller LTE downlink system bandwidth limits (here 3 MHz) the PDSCH is used for the second part of the e-DCI-2 information. The LTE Release-9 or LTE-Advanced terminals are then allocated towards the edges and probably extend in the next PDSCH OFDM symbols to the limits of the wider LTE downlink system bandwidth (here 4.2 MHz). If there are only LTE Release-8 terminals, the wider bandwidth cannot be exploited. If there are LTE Release-9 or LTE-Advanced terminals, the wider bandwidth can be used to increase cell capacity and/or to offer to the newer terminals a larger downlink peak data rate, while at the same time LTE Release-8 terminals can still be supported. As a consequence, the LTE Release-8 terminals see a 3 MHz (PDSCH) channel and the LTE Release-9 or LTE-Advanced terminals see a 4.2 MHz (PDSCH) channel.

It is to be noted that uplink channel structures being analog to the depicted downlink channel structures may equally well result from corresponding embodiments of the present invention.

Stated in other word, non-limiting embodiments of the present invention comprise the following features (in terms of the LTE example as used herein).

The LTE Release-9 bandwidth of the PDCCH may be as wide as supported by an LTE Release-8 standard bandwidth.

The LTE Release-9 PBCH, the LTE Release-9 Primary Synchronization and the LTE Release-9 Secondary Synchronization channels remain identical with LTE Release-8, and PHICH and PCFICH are used in an identical way for LTE Release-8 and LTE Release-9/LTE-Advanced.

Compliant with LTE Release-8, 1 up to 3 OFDM symbols are supported for the PDCCH and for the LTE Release-8 DCIs as standardized for LTE Release-8 and with new LTE Release-9 DCIs for LTE Release-9 or LTE-Advanced terminals. The Downlink Control Information for an LTE Release-9 or LTE-Advanced terminals may either fit into the LTE Release-8 DCI scheme (to be rate-matched to 1, 2, 4, or 8 CCEs), if the allocation of the LTE Release-9 or LTE-Advanced terminal does not differ from an LTE Release-8 allocation, or not fit into the regular LTE Release-8 DCI scheme (to be rate-matched to 1, 2, 4, or 8 CCEs). In the latter case, if the system is not fully loaded, a new extended DCI (e-DCI-1) format for LTE Release-9 or LTE-Advanced may combine two LTE Release-8 DCIs to capture the e-DCI-1 format. Otherwise, if the system is fully loaded and PDCCH resources are scarce, an alternate extended DCI format (e-DCI-2) for LTE Release-9 or LTE-Advanced terminal may be defined which consists of one LTE Release-8 DCI as DCI anchor and $1^{st}$ part of the DCI information in the PDCCH plus an additional dedicated PDSCH resource for the $2^{nd}$ part of the DCI information.

The eNodeB or base station, which performs such a method, schedules all LTE Release-8 terminals into the LTE Release-8 supported bandwidth for the PDSCH (here: 3 MHz centered) and all the LTE Release-9 or LTE-Advanced terminals into the LTE Release-9 or LTE-Advanced PDSCH carrier bandwidth (here: 4.2 MHz centered).

Figure 7:
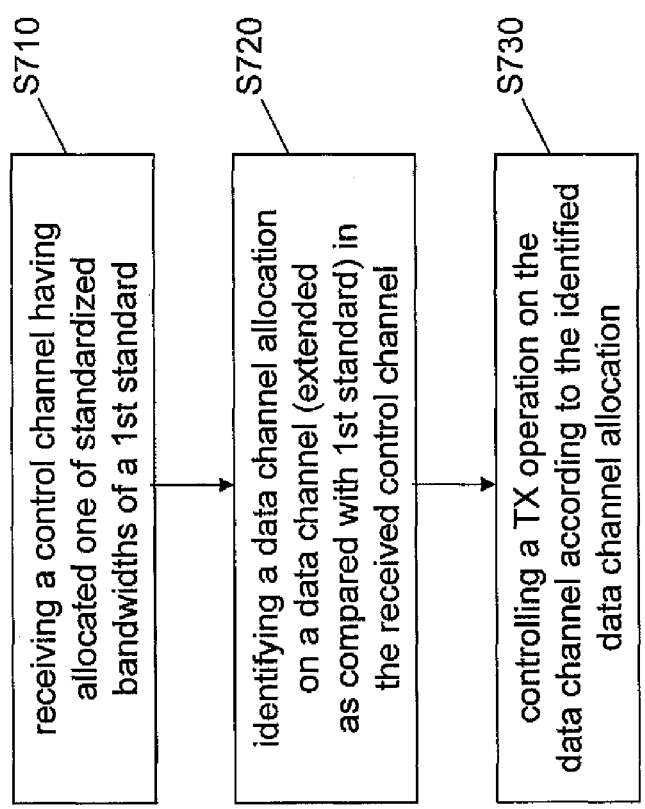
FIG. 7 shows a flow diagram of another generic method according to an embodiment of the present invention.

FIG. 7 shows a flow diagram of another generic method according to an embodiment of the present invention.

In most generic terms, a method according to an embodiment of the present invention as depicted in FIG. 7 comprises a receiving operation (S710), an identifying operation (S720) and a controlling operation (S730). In the operation S710, a control channel (e.g. a downlink control channel such as the PDCCH) having allocated one of a first plurality of bandwidths being standardized for a first radio access standard (e.g. LTE Release-8) is received. In operation S720, a data channel allocation on a data channel (e.g. a downlink data channel such as the PDSCH having allocated one of a second plurality of bandwidths being standardized for a second radio access standard (e.g. LTE Release-9 or advanced) is identified in the received control channel.

Thereby, according to the present embodiment, the second bandwidths plurality exceeds the first bandwidths plurality in terms of at least one of granularity and range. In operation S730, a data transmission operation on the data channel (in the case of downlink transmission, e.g. a downlink data channel such as the PDSCH) is controlled in accordance with the identified data channel allocation. For example, the first radio access standard may be in accordance with LTE Release-8, wherein the standardized plurality of bandwidths e.g. includes 1.4 MHz, 3 MHz, 5 MHz, 10 MHz, 15 MHz, or 20 MHz. For example, the second radio access standard may be in accordance with LTE Release-9 or advanced, wherein the standardized plurality of bandwidths includes any implementable available (operator or system) bandwidth. Accordingly, the channel structure and capabilities underlying the present and following embodiments correspond to those underlying the previous embodiments.

According to the present embodiment, this method is performed at a mobile station and an evolved user equipment in an evolved radio access network (e.g. E-UTRAN, LTE).

Figure 8:
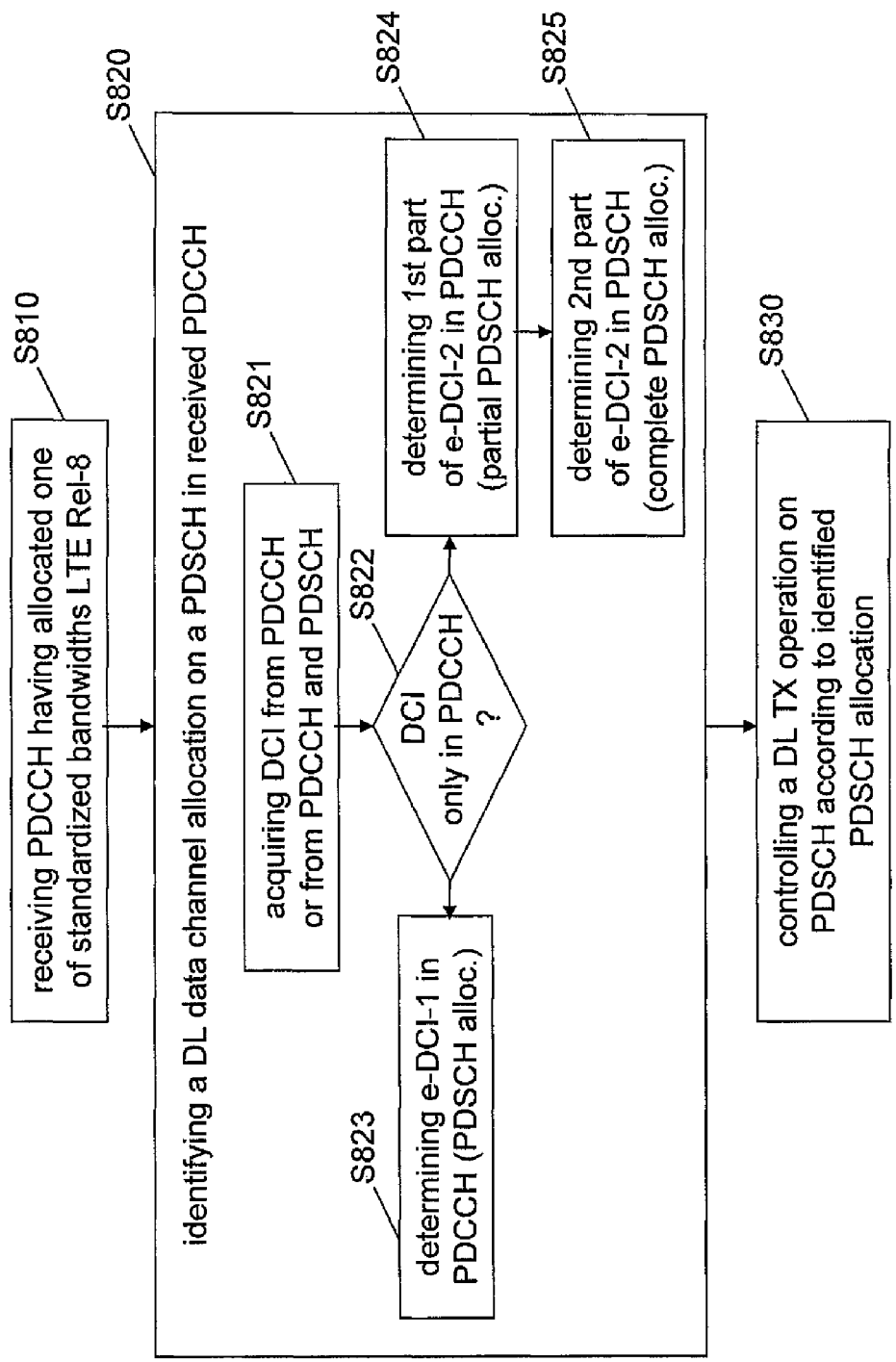
FIG. 8 shows a flow diagram of an exemplary method of downlink control according to an embodiment of the present invention.

FIG. 8 shows a flow diagram of an exemplary method of downlink control according to an embodiment of the present invention, which is exemplarily set out for a downlink case.

According to the thus depicted embodiment according to FIG. 8, the receiving operation (S810), the identifying operation (S820) and the controlling operation (S830) basically correspond to the respective operations according to the embodiment of FIG. 7. According to FIG. 8, the implementation of the identification operation S820 is depicted in more detail.

According to the present embodiment, the identification operation comprises an acquiring of downlink control information (DCI) at least in the received downlink control channel within a bandwidth area of the first bandwidths plurality being supported by the first radio access standard (S821). This DCI acquisition basically constitutes the correspondent to the inclusion of such DCI according to any one of operations S222 and S300 at the network side. Accordingly, the following determination of a downlink data channel allocation on the basis of the thus acquired downlink control information is basically correspondent to the insertion operations and types of inserted DCI formats according to any one of operations S310 to S350 at the network side.

Namely, in operation S822 according to FIG. 8, it is distinguished whether or not the acquired downlink control information is located (only) in the downlink control channel. If so (YES in S822), the downlink data channel allocation is determined (in one single step) on the basis of the thus acquired downlink control information (e.g. e-DCI-1) in the downlink control channel (e.g. PDCCH). The above applies, when assuming that the apparatus executing the present method complies with the second standard (i.e. is an LTE Release-9 or advanced terminal). Otherwise (NO in S822), i.e. if a first part of the acquired downlink control information serving as an anchor is located in the downlink control channel and a second part of the downlink control information serving as a supplement, to which the anchor refers, is located in the downlink data channel, the downlink data channel allocation is determined in a two-step-approach as mentioned above. Namely, in a first step (S824), a partial downlink data channel allocation in a bandwidth area of the first bandwidths plurality being supported by the first radio access standard is determined on the basis of the acquired first part of the downlink control information in the downlink control channel. Then, in a second step (S825), a complete downlink data channel allocation in a bandwidth area of the second bandwidths plurality being supported by the second radio access standard is determined on the basis of the acquired second part of the downlink control information in the downlink data channel.

For example, if the above-described e-DCI-2 format is used for an LTE Release-9 or LTE-Advanced terminal, the latter first identifies its partial PDSCH allocation (in 3 MHz limits) via the DCI anchor and $1^{st}$ part of the DCI information in the PDCCH, and then identifies its full PDSCH allocation (in 4.2 MHz limits) from the $2^{nd}$ part of the e-DCI-2 information, which is exemplarily located in the first PDSCH OFDM symbol following the PDCCH.

According to an exemplary embodiment of the present invention, the controlling operation according to S730 of FIG. 7 or S830 of FIG. 8 comprises the following. For example, a receiver of an LTE Release-8 terminal directly converts (from the maximum bandwidth of 20 MHz according to LTE Release-8) into the baseband, and then filters by digital filtering down to the channel of 3 MHz bandwidth in line with the exemplary scenario used herein. On the other hand, a receiver of an LTE Release-9 or advanced terminal directly converts (from the maximum bandwidth according to LTE Release-9, i.e. operator bandwidth) into the baseband, and then filters by digital filtering down to the 3 MHz PDCCH control channel (and for example the first PDSCH OFDM symbol for e-DCI-2 formats) and then further to the 4.2 MHz PDSCH channel (i.e. two-step-approach).

It is to be noted that the above-described method according to FIG. 8 is analogously applicable for an uplink case, in which e.g. the PUCCH serves as the uplink control channel and the PUSCH serves as the uplink data channel.

Although in the foregoing embodiments of embodiments of the present invention have been described mainly with reference to methods, procedures and functions, corresponding embodiments of the present invention also cover respective apparatuses, network nodes, including both software and/or hardware thereof.

Respective exemplary embodiments of the present invention are described below referring to FIGS. 9 and 10, while for the sake of brevity reference is made to the detailed description of respective corresponding methods and operations according to FIGS. 1 to 3 and 7 to 8, respectively. Also in this regard, though downlink cases are described as illustrative but non-limiting examples, analog features also apply for uplink cases.

Figure 9:
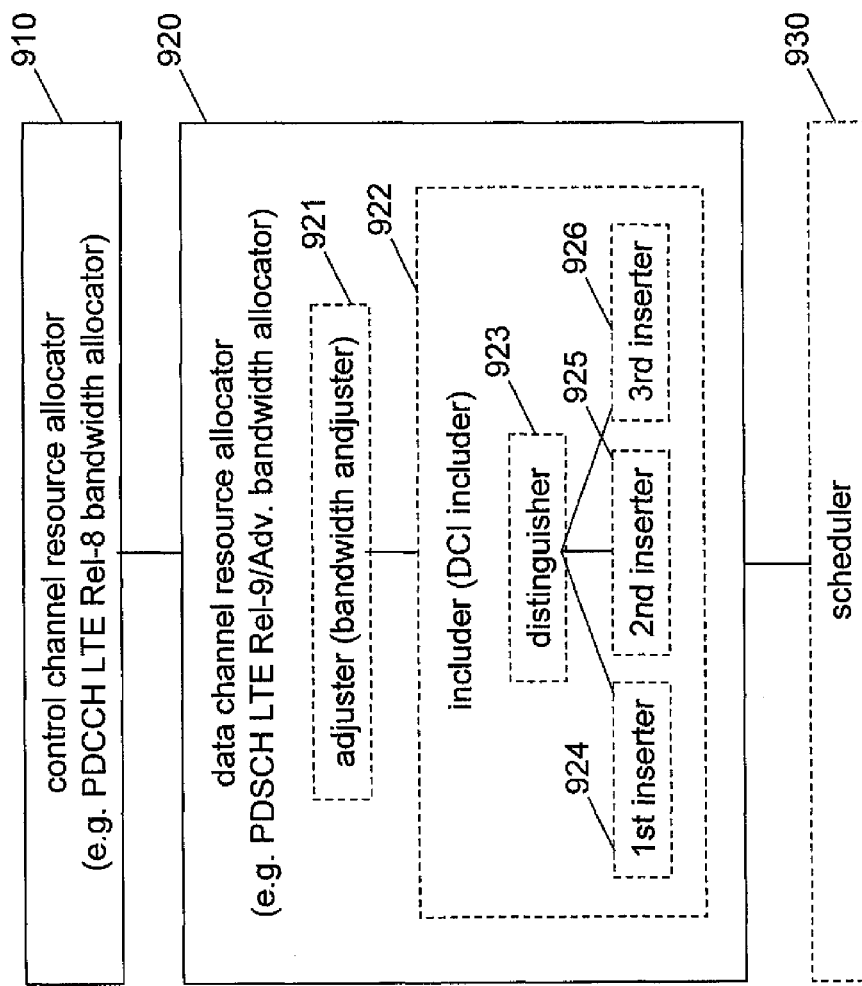
FIG. 9 shows a schematic block diagram of an apparatus according to an embodiment of the present invention.

FIG. 9 shows a schematic block diagram of an apparatus according to an embodiment of the present invention. The thus depicted apparatus may for example be implemented in or by a base station or an evolved radio access node (e.g. eNodeB) in an evolved radio access network (e.g. LTE, E-UTRAN). Hence, such a base station or an evolved radio access node (e.g. eNodeB) represents a particular machine on which a corresponding software implementation of the respective embodiments may be executed.

In FIG. 9, the solid line blocks are basically configured to perform the generic method according to FIG. 1 above, while the dashed line blocks are regarded to be optional. The entirety of solid line blocks and dashed line blocks are basically configured to perform the method according to any one of FIGS. 2 and 3 above, respectively.

Namely, according to FIG. 9, the thus depicted apparatus comprises a control channel resource allocator 910 and a data channel resource allocator 920. Stated in general terms, the control channel resource allocator 910 represents means for allocating, to a (downlink) control channel, one of a first plurality of bandwidths being standardized for a first radio access standard, i.e. to perform the operation according to S110 of FIG. 1 or S210 of FIG. 2. The data channel resource allocator 920 represents means for allocating, to a (downlink) data channel, one of a second plurality of bandwidths being standardized for a second radio access standard, wherein the second bandwidths plurality exceeds the first bandwidths plurality in terms of at least one of granularity and range, i.e. to perform the operation according to S120 of FIG. 1 or S220 of FIG. 2. The apparatus optionally also comprises a scheduler 930 which represents means for scheduling according to the operation S230 of FIG. 2.

According to FIG. 9, the data channel resource allocator 920 optionally comprises at least one of an adjuster 921 representing means for adjusting the one allocated bandwidth of the second plurality of bandwidths to an available bandwidth spectrum (according to operation S221 of FIG. 2), and an includer 922 representing means for including (downlink) control information being specific for a terminal to be scheduled at least into the allocated (downlink) control channel within a bandwidth area of the first bandwidths plurality being supported by the first radio access standard (according to S222 of FIG. 2 and S310 to S350 of FIG. 3). In detail, the includer 922 optionally comprises a distinguisher 923 representing means for performing the distinguishing operations according to S310 and S330 of FIG. 3. According to the distinction result yielded by the distinguisher 923, one of the first inserter 924, the second inserter 925 and the third inserter 926 of the includer 922 is triggered to operate accordingly. The first inserter 924 represents means for performing an insertion of (downlink) control information (i.e. LTE Release-8 DCI, for example) according to operation S320 of FIG. 3. The second inserter 925 represents means for performing an insertion of (downlink) control information (i.e. e-DCI-2) according to operations S340, S341 and S342 of FIG. 3. The third inserter 926 represents means for performing an insertion of (downlink) control information (i.e. e-DCI-1) according to operation S350 of FIG. 3.

Figure 10:
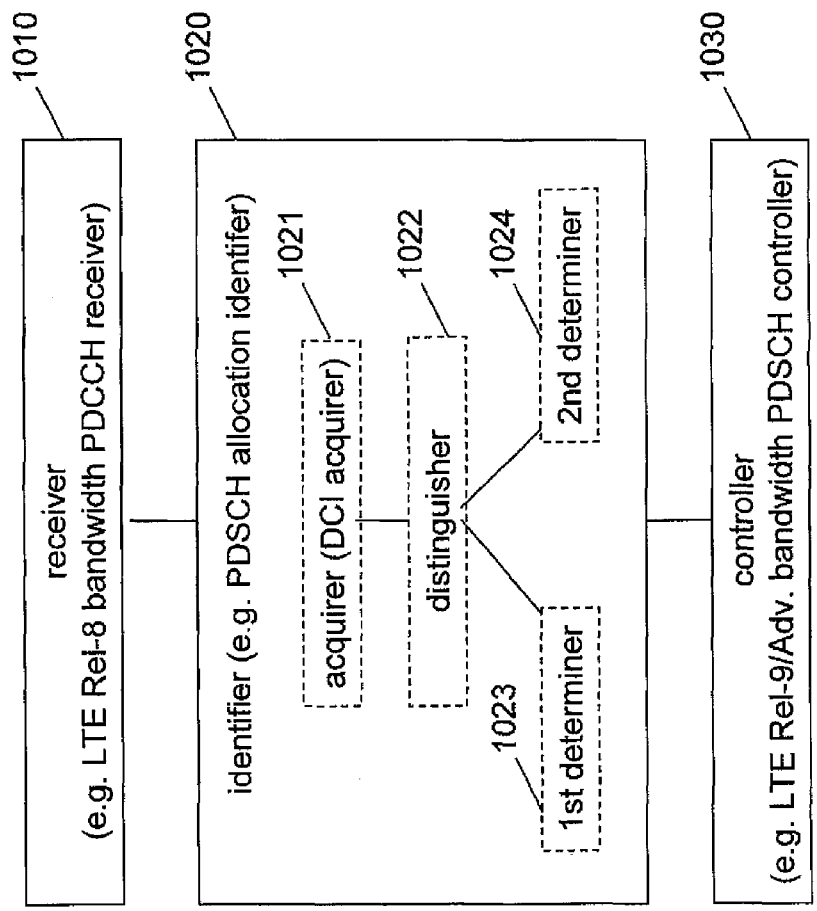
FIG. 10 shows a schematic block diagram of another apparatus according to an embodiment of the present invention.

FIG. 10 shows a schematic block diagram of another apparatus according to an embodiment of the present invention. The thus depicted apparatus may for example be implemented in or by a mobile station or an evolved user equipment (UE) in an evolved radio access network (e.g. LTE, E-UTRAN). Hence, such a mobile station or a user equipment represents a particular machine on which a corresponding software implementation of the respective embodiments may be executed.

In FIG. 10, the solid line blocks are basically configured to perform the generic method according to FIG. 7 above, while the dashed line blocks are regarded to be optional. The entirety of solid line blocks and dashed line blocks are basically configured to perform the method according to FIG. 8 above.

Namely, according to FIG. 10, the thus depicted apparatus comprises a receiver 1010, an identifier 1020 and a controller 1030. Stated in general terms, the receiver 1010 represents means for receiving a (downlink) control channel having allocated one of a first plurality of bandwidths being standardized for a first radio access standard, i.e. to perform the operation according to S710 of FIG. 7 or S810 of FIG. 8. The identifier 1020 represents means for identifying, in the received (downlink) control channel, a (downlink) data channel allocation on a (downlink) data channel, the (downlink) data channel having allocated one of a second plurality of bandwidths being standardized for a second radio access standard, wherein the second bandwidths plurality exceeds the first bandwidths plurality in terms of at least one of granularity and range, i.e. to perform the operation according to S720 of FIG. 7 or S820 to S825 of FIG. 8. Further, the controller 1030 represents means for controlling a (downlink) data transmission operation of the apparatus on the (downlink) data channel in accordance with the identified (downlink) data channel allocation, i.e. to perform the operation according to S730 of FIG. 7 or S830 of FIG. 8.

According to FIG. 10, the identifier 1020 optionally comprises an acquirer 1021 representing means for acquiring (downlink) control information at least in the received (downlink) control channel within a bandwidth area of the first bandwidths plurality being supported by the first radio access standard (according to operation S821 of FIG. 8). Further, in association with the acquirer 1021, the identifier 1020 optionally comprises a distinguisher 1022 representing means for performing the distinguishing operation according to S822 of FIG. 8. According to the distinction result yielded by the distinguisher 1022, one the first determiner 1023 and the second determiner 1024 of the identifier 1020 is triggered to operate accordingly. The first determiner 1023 represents means for performing a determination of a (downlink) data channel allocation according to operation S823 of FIG. 8 (i.e. one-step determination). The second determiner 1024 represents means for performing a determination of a (downlink) data channel allocation according to operations S824 and S825 of FIG. 8 (i.e. two-step determination).

For the above block diagrams of FIGS. 9 and 10, the following is to be noted. The individual blocks are meant to illustrate respective functional blocks implementing a respective function, process or procedure, respectively. Such functional blocks are implementation-independent, i.e. may be implemented by means of any kind of hardware or software, respectively. The lines interconnecting individual blocks are meant to illustrate an operational coupling therebetween, which on the one hand is implementation-independent (e.g. wired or wireless) and on the other hand may also comprise an arbitrary number of intermediary functional entities not shown.

In FIGS. 9 and 10, only those functional blocks are illustrated, which relate to any one of the above-described methods, procedures and functions. A skilled person is deemed to acknowledge the presence of any other conventional functional blocks required for an operation of respective structural arrangements, such as e.g. a power supply, a central processing unit or the like.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Furthermore, method steps and functions likely to be implemented as software code portions and being run using a processor at one of the entities are software code independent and can be specified using any known or future developed programming language such as e.g. Java, C++, C, and Assembler. Method steps and/or devices or means likely to be implemented as hardware components at one of the entities are hardware independent and can be implemented using any known or future developed hardware technology or any hybrids of these, such as MOS, CMOS, BiCMOS, ECL, TTL, etc, using for example ASIC components or DSP components, as an example. Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to those skilled in the art.

Software in the sense of the present description comprises software code as such comprising code means for performing the respective functions, as well as software (or a computer program or a computer program product) embodied on a tangible medium such as a computer-readable storage medium having stored thereon a respective data structure or code portions or embodied in a signal or in a chip, potentially during processing thereof.

Generally, for the purpose of the present invention as described herein above, it should be noted that an access technology may be any technology by means of which a user equipment can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed lines but also circuits switched access technologies; access technologies may be distinguishable in at least two categories or access domains such as packet switched and circuit switched, but the existence of more than two access domains does not impede the invention being applied thereto, an access network may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user may experience services from an access network such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The present invention also covers any conceivable combination of method steps and operations described above, and any conceivable combination of nodes, apparatuses, modules or elements described above, as long as the above-described concepts of methodology and structural arrangement are applicable.

There is provided fine-grain and backward-compliant resource allocation, comprising allocating, to a control channel, one of a first plurality of bandwidths being standardized for a first radio access standard, and allocating, to a data channel, one of a second plurality of bandwidths being standardized for a second radio access standard, the second bandwidths plurality exceeding the first bandwidths plurality in terms of at least one of granularity and range. The thus disclosed resource allocation may exemplarily be applied on a downlink.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

The invention claimed is:

1. A method, comprising
allocating, to a control channel for a communication device, one of a first plurality of bandwidths being standardized for a first radio access standard, wherein the communication device utilizes a second radio access standard to communicate for a service, and
allocating, to a data channel for the communication device to receive the service, one of a second plurality of bandwidths being standardized for the second radio access standard, wherein the second plurality of bandwidths exceeding the first plurality of bandwidths in terms of at least one of granularity and range, and the allocation of the data channel is identified in the control channel.

2. The method according to claim 1, further comprising scheduling a terminal to a bandwidth area of the allocated data channel,
wherein a terminal complying with the first radio access standard is scheduled to a bandwidth area of the first plurality of bandwidths being supported by the first radio access standard, and a terminal complying with the second radio access standard is scheduled to a bandwidth area of the second plurality of bandwidths being supported by the second radio access standard.

3. The method according to claim 1, wherein the data channel allocation comprises
adjusting said one allocated bandwidth of the second plurality of bandwidths to an available bandwidth spectrum.

4. The method according to claim 1, wherein the data channel allocation comprises
including control information being specific for a terminal to be scheduled at least into the allocated control channel within a bandwidth area of the first plurality of bandwidths being supported by the first radio access standard.

5. The method according to claim 4, wherein the control information inclusion for a terminal complying with the first radio access standard or a terminal complying with the second radio access standard and fitting into a resource allocation control scheme according to the first radio access standard comprises
inserting, into the allocated control channel, the control information for resource allocation in the allocated data channel within a bandwidth area of the first plurality of bandwidths being supported by the first radio access standard.

6. The method according to claim 4, wherein the control information inclusion for a terminal complying with the second radio access standard and not fitting into a resource allocation control scheme according to the first radio access standard comprises
inserting, into the allocated control channel, the control information for resource allocation in the allocated data channel within a bandwidth area of the second plurality of bandwidths being supported by the second radio access standard.

7. The method according to claim 4, wherein the control information inclusion for a terminal complying with the second radio access standard and not fitting into a resource allocation control scheme according to the first radio access standard comprises
inserting, at least into the allocated control channel and the allocated data channel, the control information for resource allocation in the allocated data channel within a bandwidth area of the second plurality of bandwidths being supported by the second radio access standard.

8. An apparatus, comprising
a control channel resource allocator configured to allocate, to a control channel for a communication device, one of a first plurality of bandwidths being standardized for a first radio access standard, wherein the communication device utilizes a second radio access standard to communicate for a service, and
a data channel resource allocator configured to allocate, to a data channel for the communication device to receive the service, one of a second plurality of bandwidths being standardized for the second radio access standard, wherein the second plurality of bandwidths exceeding the first plurality of bandwidths in terms of at least one of granularity and range, and the allocation of the data channel is identified in the control channel.

9. The apparatus according to claim 8, further comprising a scheduler configured to schedule a terminal to a bandwidth area of the allocated data channel,
wherein the scheduler is configured such that a terminal complying with the first radio access standard is scheduled to a bandwidth area of the first plurality of bandwidths being supported by the first radio access standard, and a terminal complying with the second radio access standard is scheduled to a bandwidth area of the second plurality of bandwidths being supported by the second radio access standard.

10. The apparatus according to claim 8, wherein the data channel allocator comprises
an adjuster configured to adjust said one allocated bandwidth of the second plurality of bandwidths to an available bandwidth spectrum.

11. The apparatus according to claim 8, wherein the data channel allocator comprises
an includer configured to include control information being specific for a terminal to be scheduled at least into the allocated control channel within a bandwidth area of the first plurality of bandwidths being supported by the first radio access standard.

12. The apparatus according to claim 11, wherein the includer comprises a first inserter configured to insert, for a terminal complying with the first radio access standard or a terminal complying with the second radio access standard and fitting into a resource allocation control scheme according to the first radio access standard, into the allocated control channel, the control information for resource allocation in the allocated data channel within a bandwidth area of the first plurality of bandwidths being supported by the first radio access standard.

13. The apparatus according to claim 11, wherein the includer comprises a second inserter configured to insert, for a terminal complying with the second radio access standard and not fitting into a resource allocation control scheme according to the first radio access standard, into the allocated control channel, the control information for resource allocation in the allocated data channel within a bandwidth area of the second plurality of bandwidths being supported by the second radio access standard.

14. The apparatus according to claim 11, wherein the includer comprises a third inserter configured to insert, for a terminal complying with the second radio access standard and not fitting into a resource allocation control scheme according to the first radio access standard, into the allocated control channel and the allocated data channel, the control information for resource allocation in the allocated data channel within a bandwidth area of the second plurality of bandwidths being supported by the second radio access standard.

15. A method comprising
receiving by a communication device, a control channel having allocated one of a first plurality of bandwidths being standardized for a first radio access standard,
identifying, in the received control channel, a data channel allocation on a data channel for the communication device to receive a service via a second radio access standard, the data channel having allocated one of a second plurality of bandwidths being standardized for the second radio access standard, the second plurality of bandwidths exceeding the first plurality of bandwidths in terms of at least one of granularity and range, and controlling a data transmission operation on the data channel in accordance with the identified data channel allocation.

16. The method according to claim 15, wherein the data channel allocation identification comprises acquiring control information at least in the received control channel within a bandwidth area of the first plurality of bandwidths being supported by the first radio access standard.

17. The method according to claim 16, if the acquired control information is located in the control channel, comprising determining the data channel allocation on the basis of the acquired control information in the control channel.

18. The method according to claim 16, if a first part of the acquired control information serving as an anchor is located in the control channel and a second part of the control information serving as a supplement, to which the anchor refers, is located in the data channel, comprising determining a partial data channel allocation in a bandwidth area of the first plurality of bandwidths being supported by the first radio access standard on the basis of the acquired first part of the control information in the control channel, and determining a complete data channel allocation in a bandwidth area of the second plurality of bandwidths being supported by the second radio access standard on the basis of the acquired second part of the control information in the data channel.

19. The method according to claim 18, wherein the second part of the control information is inserted in a first modulation symbol of the data channel, which directly follows the control channel.

20. An apparatus comprising a receiver configured to receive a control channel having allocated one of a first plurality of bandwidths being standardized for a first radio access standard, an identifier configured to identify, in the received control channel, a data channel allocation on a data channel to receive a service via a second radio access standard, the data channel having allocated one of a second plurality of bandwidths being standardized for the second radio access standard, the second plurality of bandwidths exceeding the first plurality of bandwidths in terms of at least one of granularity and range, and a controller configured to control a data transmission operation of the apparatus on the data channel in accordance with the identified data channel allocation.

21. The apparatus according to claim 20, wherein the identifier comprises an acquirer configured to acquire control information at least in the received control channel within a bandwidth area of the first plurality of bandwidths being supported by the first radio access standard.

22. The apparatus according to claim 21, further comprising a first determiner configured to determine the data channel allocation on the basis of the acquired control information, the first determiner being configured, if the acquired control information is located in the control channel, to determine the data channel allocation on the basis of the acquired control information in the control channel.

23. The apparatus according to claim 21, further comprising a second determiner configured to determine the data channel allocation on the basis of the acquired control information, the second determiner being configured, if a first part of the acquired control information serving as an anchor is located in the control channel and a second part of the control information serving as a supplement, to which the anchor refers, is located in the data channel, to determine a partial data channel allocation in a bandwidth area of the first plurality of bandwidths being supported by the first radio access standard on the basis of the acquired first part of the control information in the control channel, and to determine a complete data channel allocation in a bandwidth area of the second plurality of bandwidths being supported by the second radio access standard on the basis of the acquired second part of the control information in the data channel.

* * * * *